J. F. TRITLE.
SERIES PARALLEL CONTROL SYSTEM.
APPLICATION FILED DEC. 26, 1913.

1,160,673.

Patented Nov. 16, 1915.
2 SHEETS—SHEET 1.

WITNESSES:

INVENTOR:
JOHN F. TRITLE,
BY
HIS ATTORNEY.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

SERIES-PARALLEL CONTROL SYSTEM.

1,160,673.  Specification of Letters Patent.  Patented Nov. 16, 1915.

Application filed December 26, 1913. Serial No. 808,700.

*To all whom it may concern:*

Be it known that I, JOHN F. TRITLE, a citizen of the United States, residing at Schenectady, county of Schenectady, State of New York, have invented certain new and useful Improvements in Series-Parallel Control Systems, of which the following is a specification.

This invention relates to the control of electric motors, and especially to a plurality of railway motors.

The object of the invention is to simplify and improve the control of a railway car equipment comprising four motors, whereby they can be connected in series, series parallel or parallel, as desired.

One feature of the invention is the fact that the current is reversed through only two of the motors per acceleration. Moreover, provision is made for obtaining a small amount of current momentarily through two of said motors on the seventh point so as to establish the field flux in the proper direction before throwing these motors across the line. In passing from series to series parallel, the current is kept flowing through all the motors in the same direction.

Moreover, my invention has only a single section of resistance which is used as a starting resistance on the first point and is also used in passing from series parallel to full parallel. This makes it possible to use motors of a low internal resistance. The necessary circuit changes are accomplished with but eight contactors and six interlocks, making an extremely simple layout.

Figure 9:
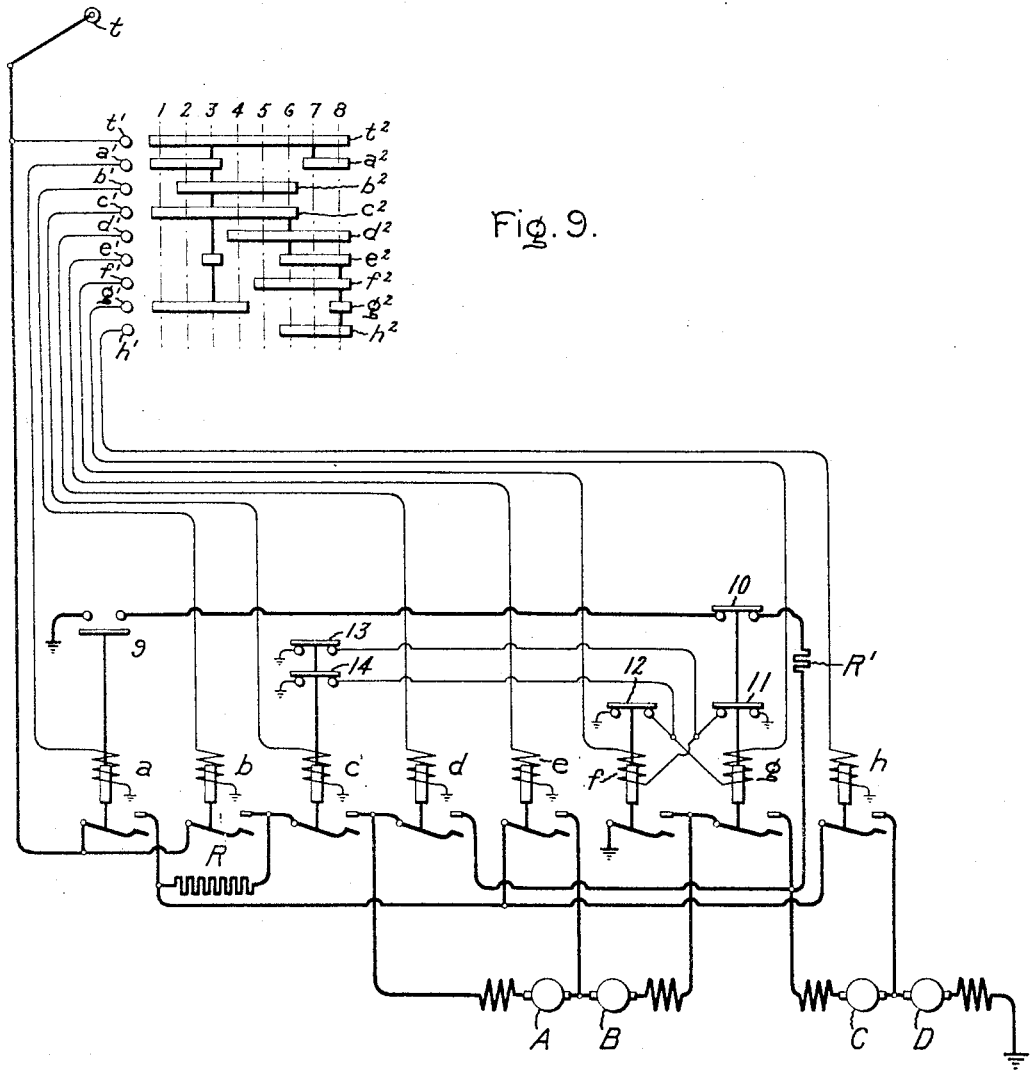

In the accompanying drawing, Figures 1 to 8 inclusive are diagrams showing the circuit connections effected by the correspondingly numbered points in the controller, and Fig. 9 is a diagram of the entire system.

In Sheet 2 of the drawing heavy lines are used to indicate the power leads and light lines the control circuits. The line current comes in through the collecting device $t$ and energizes the finger $t'$ of the controller, and also the switch arms of the contactors $a$, $b$. The fixed contact of contactor $a$ is connected through a resistance R to the fixed contact of contactor $b$ and the switch arm of contactor $c$. It is also connected to the switch arms of contactors $e$ and $h$. Motor A has one terminal connected to the fixed contact of contactor $c$ and the switch arm of contactor $d$. The other terminal of motor A and one terminal of motor B are connected to the fixed contact of contactor $e$. The other terminal of motor B is connected to the fixed contact of contactor $f$ (whose switch arm is grounded), and also to the switch arm of contactor $g$. The fixed contact of contactor $g$ is connected to one terminal of motor C, whose other terminal, together with one terminal of motor D, is connected to the fixed contact of contactor $h$. The other terminal of motor D is grounded. The fixed contact of contactor $d$ is connected to one terminal of motor C and to the fixed contact of contactor $g$ and also through a high resistance R' to ground; the circuit beyond the resistance being interrupted by two interlocks 9 and 10, the former controlled by the contactor $a$ and the latter by contactor $g$. An interlock 11 also is controlled by the contactor $g$, being interposed in the ground connection of the contactor $f$. Similarly, the contactor $f$ controls an interlock 12 in the ground connection of contactor $g$. Each of these ground connections has a shunt around its interlock, said shunts being grounded and containing respectively the interlocks 13 and 14, both of which are controlled by the contactor $c$.

The controller is preferably of the rotatable drum type, and it is shown developed in Fig. 9. Segment $t^2$ extends across all eight positions and is connected with segment $a^2$ which is in two parts, one covering positions 1, 2, 3 and the other points 7 and 8. Segment $b^2$ covers points 2 to 6 inclusive. Segment $c^2$ covers the first six points. Segment $d^2$ covers the last five points. Segment $e^2$ covers points 3, 6, 7 and 8. Segment $f^2$ covers points 5, 6, 7 and 8. Segment $g^2$ covers points 1, 2, 3, 4 and 8, and segment $h^2$ covers points 6, 7 and 8. All these segments are connected with segment $t^2$, and they coöperate respectively with the fingers $a'$ to $h'$, which in turn are respectively connected with the contactors $a$ to $h$; one terminal of each contactor being grounded.

Figure 1:
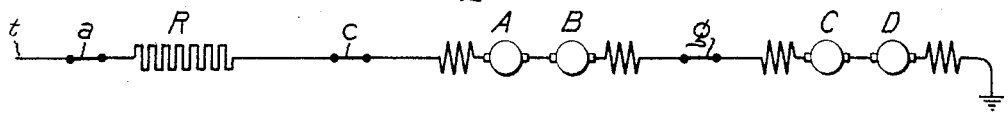
Figure 2:
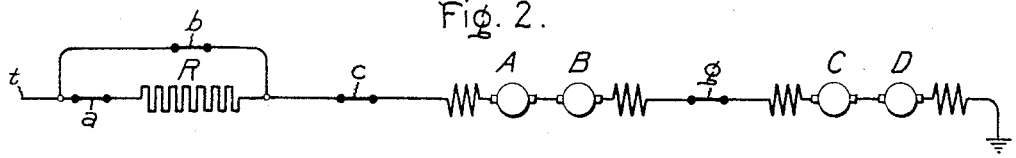
Figure 3:
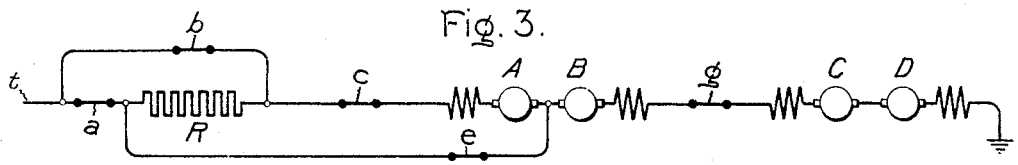
Figure 4:
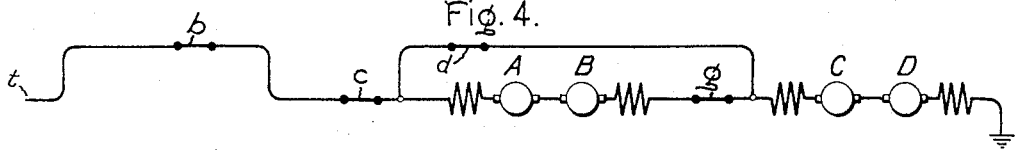
Figure 5:
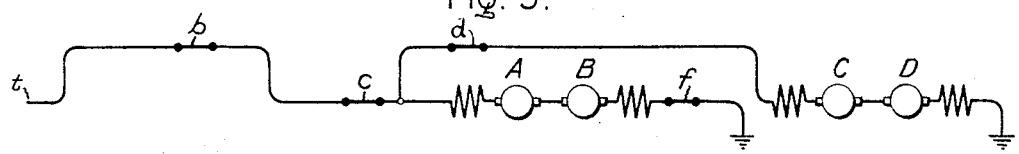
Figure 6:
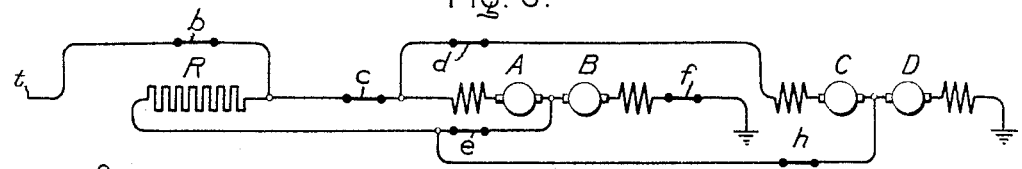
Figure 7:
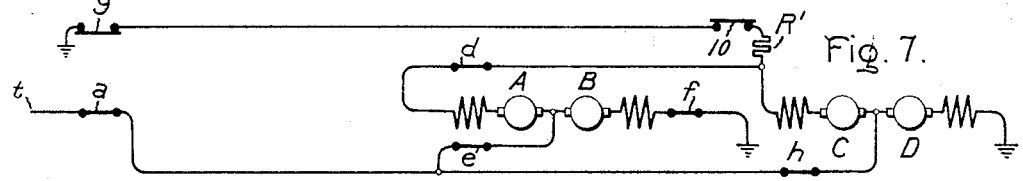
Figure 8:
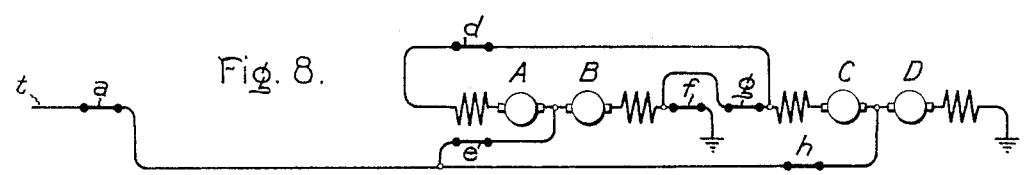

The operation is as follows: Point 1:

Contactors *a*, *c* and *g* pick up, and line current flows through the resistance R and the four motors in series (Fig. 1). Point 2: Contactors *a*, *b*, *c* and *g* pick up, shunting the resistance. Point 3: Contactors *a*, *b*, *c*, *e* and *g* pick up, and motor A is shunted in addition to the resistance R, the other three motors remaining in series across the line. Point 4: Contactors *b*, *c*, *d* and *g* pick up, cutting out the resistance R and short-circuiting motors A and B. Point 5: Contactors *b*, *c*, *d* and *f* pick up, grounding one terminal of motor B and putting the four motors in series parallel connection. Point 6: Contactors *b*, *c*, *d*, *e*, *f* and *h* pick up, shunting motors A and C with the resistance R and connecting the combination in series with B and D which are in parallel. Point 7: Contactors *a*, *d*, *e*, *f* and *h* pick up, cutting out the resistance from the circuits of motors B and D, and reversing the direction of current through motors A and C which are grounded in parallel through the high resistance R'. Point 8: Contactors *a*, *d*, *e*, *f*, *g* and *h* pick up, connecting all the motors in parallel.

It will be seen that the interlocks 9 and 10 are not closed at the same time except in point 7, so that the circuit containing the high resistance R' is open in all other positions of the controller. Moreover, the circuit of contactor *f* is held open by the interlocks 11 and 13 on points 1, 2, 3 and 4, thus preventing any possibility of motor B being grounded; while the circuit of contactor *g* is likewise held open by the interlocks 12 and 14 on the series parallel points 5 and 6 to prevent any accidental connection between motors B and C at that time.

In passing from series to series parallel, three motors are connected across the line (Fig. 3) preparatory to short-circuiting one pair of motors (Fig. 4), and finally throwing both pairs across the line (Fig. 5), the current flowing through them all in the same direction as in series.

In passing to the first step parallel (Fig. 6), the starting resistance is connected in shunt with one pair of motors and the combination in series with the other pair of motors, producing a smooth transfer and good commutation on the two motors in service at moment of transfer. In the next step (Fig. 7), a small amount of current is flashed through the two motors which are to be turned over, so as to get their magnetism in the right direction before full line current is turned on (Fig. 8), thus preventing the transformer action in the motors which produces bad commutation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The method of controlling a plurality of pairs of electric motors, all of which are connected in series, the motors of each pair being permanently connected, which consists in connecting said pairs in series parallel, shunting two of said motors, one of each pair through a resistance, short-circuiting said pair of motors thereby throwing the other pair of motors across the line without resistance in circuit, the current flowing through them in the same direction as in series.

2. The method of controlling a plurality of pairs of electric motors connected in series, the motors of each pair being permanently connected, which consists in opening the circuit between the pairs of motors in passing from series to series parallel whereby the current flows in the same direction through the motors as in series, and then shunting two motors, one of each pair through a resistance in going from series parallel to parallel.

3. The method of controlling a plurality of pairs of electric motors, all of which are connected in series, the motors of each pair being permanently connected, which consists in short-circuiting one motor of a pair in passing from series to series parallel, then short-circuiting the other motor of the pair, opening the circuit between the pair of motors, and finally connecting the first pair of motors to ground, and placing the two pairs in parallel across the line.

4. The method of controlling a plurality of pairs of electric motors, all of which are connected in series, the motors of each pair being permanently connected, which consists in connecting said pairs of motors in series parallel, shunting two of said motors, one of each pair through a resistance, short-circuiting said pair of motors thereby throwing the other pair of motors across the line without resistance in circuit, connecting the pair of motors which were short-circuited through a high resistance to ground and then short-circuiting the resistance.

5. A step in the method of controlling a plurality of electric motors connected in series parallel, which consists in flashing a small amount of current through two of said motors preparatory to reversing the current through them in passing to parallel connection.

6. The method of controlling a plurality of electric motors connected in series parallel, which consists in shunting two of said motors through a resistance, and connecting the combination in series with the other motors, then cutting out the shunt resistance and connecting the two motors to ground through a high resistance with the current reversed through them, and finally cutting out said high resistance.

In witness whereof, I have hereunto set my hand this 23rd day of December, 1913.

JOHN F. TRITLE.

Witnesses:
BENJAMIN B. HULL,
MARGARET E. WOOLLEY.